US012806773B2

(12) United States Patent
Gebhardt et al.

(10) Patent No.: US 12,806,773 B2
(45) Date of Patent: Nov. 24, 2026

(54) INTERACTION SYSTEM FOR ANIMATED FIGURES

(71) Applicant: Universal City Studios LLC, Universal City, CA (US)

(72) Inventors: Michael Gebhardt, Winter Garden, FL (US); Braden Barnett, Prospect, KY (US)

(73) Assignee: Universal City Studios LLC, Universal City, CA (US)

( * ) Notice: Subject to any disclaimer, the term of this patent is extended or adjusted under 35 U.S.C. 154(b) by 349 days.

(21) Appl. No.: 18/176,954

(22) Filed: Mar. 1, 2023

(65) Prior Publication Data

US 2024/0253219 A1 Aug. 1, 2024

Related U.S. Application Data

(60) Provisional application No. 63/442,308, filed on Jan. 31, 2023.

(51) Int. Cl.
*B25J 9/16* (2006.01)
*B25J 9/00* (2006.01)
(Continued)

(52) U.S. Cl.
CPC ........... *B25J 9/1633* (2013.01); *B25J 9/0003* (2013.01); *B25J 13/081* (2013.01); *B25J 19/0075* (2013.01)

(58) Field of Classification Search
CPC .... B25J 13/081; B25J 19/0075; B25J 9/0003; B25J 9/1633; G06F 3/016; G06F 3/0445;
(Continued)

(56) References Cited

U.S. PATENT DOCUMENTS 7,260,999 B2 8/2007 Divigalpitiya et al.
8,463,433 B2 * 6/2013 Nagasaka .............. B25J 13/084 700/263
(Continued)

FOREIGN PATENT DOCUMENTS

KR 101247237 B1 * 3/2013 .......... B25J 11/0015

OTHER PUBLICATIONS

ADMetro. "Surface Capacitive vs Projected Capacitive Touchscreens. Which One Is the Right Technology for Your Application." A D Metro, Jun. 6, 2022, web.archive.org/web/20220820060344/https://admetro.com/news/surface-capacitive-vs-projected-capacitive-touchscreens-which-one-is-the-right-techn (Year: 2022).*
(Continued)

*Primary Examiner* — Adam R Mott
*Assistant Examiner* — James Miller Watts, III
(74) *Attorney, Agent, or Firm* — Fletcher Yoder, P.C.

(57) ABSTRACT

An interaction system for animated figures is provided that includes an animated figure equipped with shell layers that include shell sensors. The shells sensors are embedded or adhered to the shell layers and are configured to detect applied pressure via capacitive touch technology or resistive touch technology or both. The interaction system further includes a compliance system that includes an automation controller, the shell layers, and the shell sensors. The shell sensors sense applied pressure on the shell layers of the animated figure and monitor movement of the animated figure in response to the applied pressure. The automation controller determines whether the response movement exceeds a movement threshold associated with the animated figure. If the movement exceeds the movement threshold, the automation controller brings the animated figure back into compliance with the movement threshold.

20 Claims, 4 Drawing Sheets

(51) Int. Cl.
*B25J 13/08* (2006.01)
*B25J 19/00* (2006.01)

(58) Field of Classification Search
CPC ........ G06F 3/044; G06F 3/0414; G06F 3/041; G06F 3/01
See application file for complete search history.

(56) References Cited

U.S. PATENT DOCUMENTS 8,607,651 B2 12/2013 Eventoff
10,258,895 B2 4/2019 Cortelyou et al.
10,335,695 B2 7/2019 Cortelyou et al.
10,350,504 B2 7/2019 Cortelyou et al.
10,456,696 B2 10/2019 Cortelyou et al.
10,668,393 B2 6/2020 Cortelyou et al.
10,668,394 B2 6/2020 Cortelyou et al.
10,675,547 B2 6/2020 Cortelyou et al.
10,732,197 B2 8/2020 Smoot et al.
10,913,005 B2 2/2021 Cortelyou et al.
11,229,852 B2 1/2022 Cortelyou et al.
11,247,138 B2 2/2022 Cortelyou et al.
2007/0257821 A1* 11/2007 Son ....................... G06F 3/0445 341/23
2016/0154030 A1* 6/2016 Kishida ................... G01L 1/144 324/679
2018/0004336 A1* 1/2018 Shepelev .............. G06F 3/0447
2018/0272239 A1* 9/2018 Vyas ...................... B25J 11/003
2020/0113457 A1 4/2020 Eberle et al.
2020/0269421 A1 8/2020 Koyama et al.
2021/0323169 A1* 10/2021 Tscharnuter ............. B25J 13/06
2021/0354304 A1 11/2021 Jeromin et al.
2022/0134246 A1 5/2022 Cortelyou et al.
2022/0143519 A1 5/2022 Cortelyou et al.

OTHER PUBLICATIONS

Cutkosky, M.R., Provancher, W. (2016). Force and Tactile Sensing. In: Siciliano, B., Khatib, O. (eds) Springer Handbook of Robotics. Springer Handbooks. Springer, Cham. https://doi.org/10.1007/978-3-319-32552-1_28 (Year: 2016).*
Translation of KR-101247237-B1 (Year: 2013).*
Hannay, Francis. Rigid plastics packaging: materials, processes and applications. vol. 151., p. 3, iSmithers Rapra Publishing, 2002. (Year: 2002).*
PCT/US2024/013560 International Search Report and Written Opinion mailed May 8, 2024.
U.S. Appl. No. 18/067,534, filed Dec. 16, 2022, Cortelyou.

* cited by examiner

INTERACTION SYSTEM FOR ANIMATED FIGURES

BACKGROUND

Certain entertainment settings, such as in an amusement park, may include animated figures that interact with guests at the amusement park. In addition, while interacting in the amusement park, the animated figure may encounter an object, either in the form of guest interaction or in the form of physical obstacles such as a wall or a step. Often, the interactions—whether with a guest or an object—involve the animated figure moving, changing positions, and so forth. Specifically, the movement may involve moving limbs or other features of the body of the animated figure to interact with the guests. By way of example, an animated figure may move an arm, an elbow, a hand, one or more fingers, and so forth, to make a gesture, for example, to wave at a guest, and then retrieve these body features after completing the gesture.

However, moving these body features and/or retrieving them may often cause the animated figure to act in an unexpected manner. For example, the body features may be retrieved at an unexpected speed, causing a collision with other body features of the animated figure. Similarly, the animated figure may move the body features with an unexpected speed or force, causing the animated figure to interact with surrounding features in the entertainment setting (e.g., amusement park features) in an unexpected manner.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, an interaction system includes an animated figure. The animated figure includes one or more shell layers that includes one or more shell sensors. The shells sensors configured to sense applied pressure. The animated figure also includes one or more actuators configured to move the animated figure and a compliance system. The compliance system is configured to receive first input data from the shell sensors, initiate a control routine to maneuver the one or more actuators in response to the first input data meeting a first criteria, receive second input data after initiation of the control routine, and adjust the control routine in response to the second input data falling outside of compliance with the control routine.

In one embodiment, a method to monitor for compliance of an animated figure includes sensing a force on the animated figure based on input data received from one or more shell sensors disposed on the animated figure. The method also includes determining via an automation controller that the animated figure exceeds a movement threshold associated with the animated figure based, at least in part, on the input data from the one or more shell sensors. The method also includes sending compliance instructions from the automation controller to one or more actuators to bring the movement of the animated figure into compliance with the movement threshold. The compliance instructions include instructions for the actuators to pause, stop, reverse, accelerate, or any combination thereof.

In one embodiment, a compliance system includes one or more shells that are disposed on an animated figure and include one or more shell sensors. The compliance system also includes one or more actuators and an automation controller. The automation controller is configured to monitor and control the animated figure via the one or more actuators based on input data received from the one or more shells in accordance with movement thresholds associated with the one or more shells.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
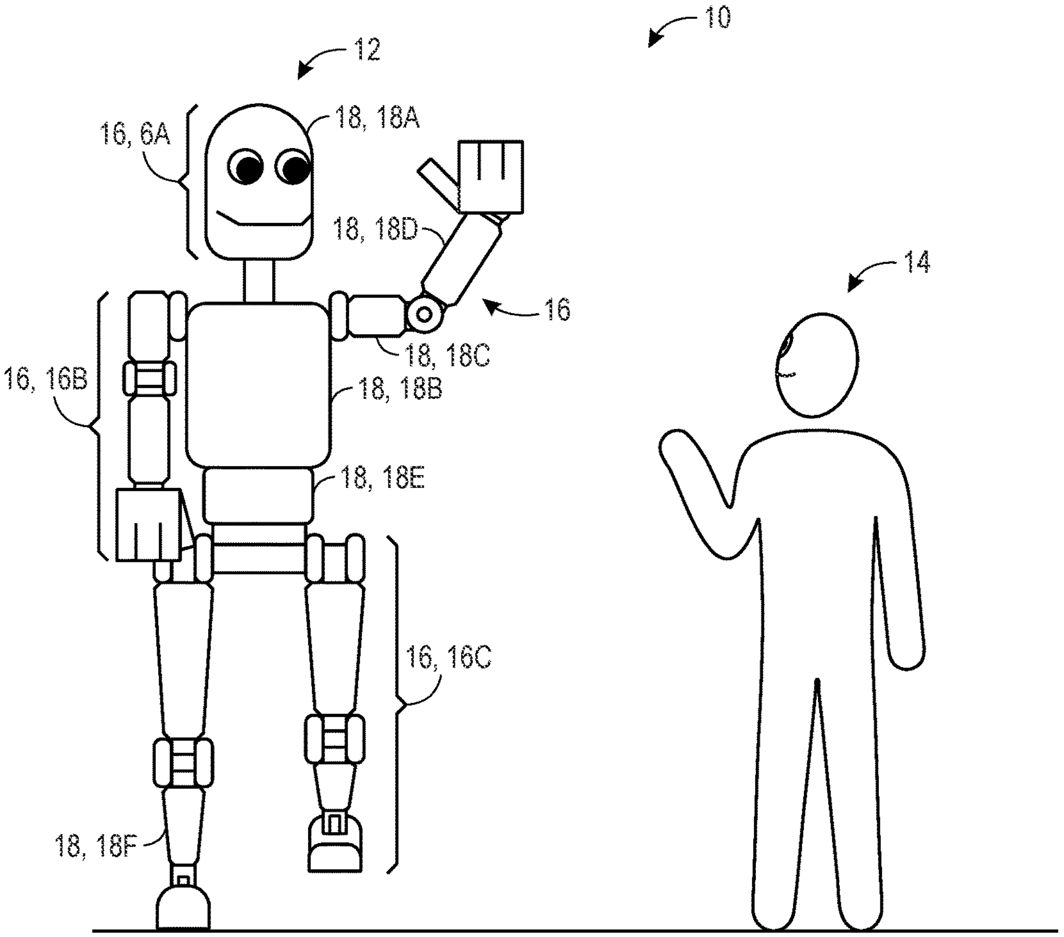
FIG. 1 is a schematic diagram of an animated figure interacting with a guest, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition (as would be understood by one of ordinary skill in the art), for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

The present disclosure relates generally to the field of amusement parks. Specifically, embodiments of the present disclosure relate to techniques for ensuring that animated figures (e.g., animatronics) interacting in an amusement park operate as expected and respond appropriately when encountering an object, either when encountering a guest or encountering a physical obstacle such as a wall or a step.

Entertainment settings may often include animated figures as part of an entertainment experience for guests. Animated figures may interact with guests in various ways, for example, by making certain movements or gestures towards the guests or by physically interacting with guests (such as, for example, responding to a guest's touch with an appropriate response). That is, the animated figure may move towards or away from a guest (e.g., walk or run towards or away from the guest), perform motions in line with a theme associated with the entertainment setting, make a gesture to the guest that requires a guest's touch, such as shaking hands with or waving a hand towards a guest, or otherwise move in a manner to interact with the guest. For each of the movements, the animated figure may actuate one or more components of the animated figure. The components may correspond to extremities, such as limbs or appendages (e.g., hands or feet), a head, and so forth, or parts of extremities, or other parts of the animated figure (e.g., torso, features on the head).

The movement of the components on the animated figure in response to an encounter with a guest or other object may be performed without regard to speed or force, and as such, the animated figure may move in an unexpected manner. By way of an example, the animated figure may encounter an object (for example collide with a wall or fall off a step) while moving back and away from a guest at a particular speed. That is, the animated figure may move at an unexpected speed, force, direction, or any combination thereof in response to this encounter. Moreover, the speed of the movement of the animated figure's response may be relatively faster than sensors associated with the animated figure used to detect nearby objects and prevent such collisions with physical objects.

In addition, the animated figure may encounter a guest and the guest may interact with an animated figure by touching the animated figure, such as on the animated figure's forearm (for example, to try and get the animated figure to further interact with the guest), on the animated figure's hand (for example a "high five"), or top of the animated figure's head (for example, a pat on the top of the head). In this situation, it may be desirable to have the animated figure respond to the guest's touch to further enhance the illusion experienced by the guest. The response from the animated figure may cause the animated figure to move at an unexpected speed, force, direction, or any combination thereof. Moreover, the speed of the movement of the animated figure may be relatively faster than sensors associated with the animated figure used to detect nearby objects and prevent such collisions with physical objects.

In some instances, the animated figure may include torque sensors or the like on the components, which may be actuators or other mechanical linkages. The torque sensors may measure a reaction force generated by the components that create torque, such as by actuating to implement the movements in response to the encounter. The speed and/or force for actuating the components to execute the response may be reduced based on the measurements of the reaction force.

However, the torque sensors may be large, often resulting in an animated figure with an increased weight and increased surface area than the animated figure without the torque sensors, and thus, reducing weight and space that may otherwise be available for other components of the animated figure. These other components may provide special effects or other entertainment effects as part of the entertainment provided by the animated figure. As such, it is now recognized that improved method and systems are desirable for verifying that animated figures comply with movement expectations (e.g., move in an expected manner) when responding to encounters with an object, including a guest or a physical obstacle. The improved method and systems may reduce weight and/or space of the animated figure including torque sensors.

The improved method and systems may include utilization of interaction systems with pressure sensing technology, including, for example, resistive touch technology or capacitance sensing technology, embedded in or adhered to a shell on an animated figure. The pressure sensing technology embedded in or adhered to a shell may detect applied pressure from contact with an object or person (e.g., force), such as a guest touching the shell on the animated figure or the animated figure running into a physical obstacle, such as a wall. For purposes of this disclosure, the term "applied pressure" means pressure from physical engagement with the shells, including force, either through deformation of the shells, capacitive touch, resistive touch, or any combination thereof. For example, as described above, the animated figure may encounter an object, which may be a physical obstacle or a guest. To provide an enhanced interactive experience with the guest, the guest may serve as the "object." That is, the guest may physically interact with the animated figure as described above. The animated figure may then sense the human touch via pressure sensing technology embedded in or adhered to the shell of the animated figure. The applied pressure (e.g., force) generated by the sensed conductive source of force (e.g., human touch) may be compared to a baseline. If the baseline is exceeded, then the animated figure responds to the human touch. The response and the force of the response may be selected from a menu of available options. The selected response may include, for example, a return high-five, hug, or a pat on the head or pulling away from the guest, etc. The selection of the response may be based on the zone in which the human touch was sensed. That is, the response selected when human touch is sensed on the animated figure's hand may be different from the response selected when human touch is sensed on the animated figure's head. In a similar way, the force of the selected response may be based on the zone in which the human touch was sensed or the selected response itself (e.g., the force of a return high five may be greater than the force of a return hug). The response of the animated figure may be measured by a compliance system. As used in the present disclosure, the term "compliance" means operating in an expected manner or redirecting movement, for example in compliance with a protocol including a control routine and movement thresholds corresponding to an animation profile, in response to an encounter with a guest or physical obstacle. For example, if the animated figure responds to an encounter in an unexpected manner such that the animated figure's movements are outside a predetermined movement threshold based on the animation profile, the animated figure is considered not in compliance until the protocol corresponding to the animation profile causes the animated figure to adjust or stop its movements until they are within the movement threshold. Thus, "compliance" refers to causing the animated figure to operate in an expected manner, that is be in compliance with the protocol (i.e., the control routine and movement thresholds), such as operating in accordance with an animation profile and within a movement threshold, and/or stopping a movement that is outside the movement threshold, and thereby changing or redirecting movement of the animated figure, based on additional information, such as input data, indicating unexpected movement or unexpected obstacles to movement. For example, the animated figure is not in compliance if input data indicates an unexpected obstacle or an error in the movement of the animated figure that is outside the movement threshold but no correction, redirection, or stop command is made. The animated figure can then be brought back into compliance by making a correction to the movement so it is back within the movement threshold, such as by stopping, redirecting, or changing the movement of the animated figure.

Alternatively or in addition to capacitive sensing technology, the interaction system may utilize non-capacitive types of sensing technology such as depth-sensing cameras or non-capacitive pressure sensing technology (e.g., resistive touch technology). Non-capacitive pressure sensing technology may enable the animated figure to encounter and respond to pressure (e.g., force) sensed from a non-conductive force. For example, non-capacitive types of pressure sensing technology in the interaction system may allow the animated figure to monitor its movements when it encounters an inanimate object (e.g., a wall, ride vehicle, etc.) or a non-capacitive human touch (e.g., a high five from a wet hand or a hug from a person in long-sleeves). In these situations, capacitive sensing technology may not apply if the animated figure encounters a force that is not a capacitor. In such situations, non-capacitive types of pressure sensing technology may be used to sense an encounter with an object or a non-capacitive touch and compare the pressure (e.g., force) sensed from the encounter with a baseline. If the baseline is exceeded, the animated figure may respond. The response and the force of the response of the animated figure may be selected from a menu of available options. The selection of the response may be based on the zone in which the non-conductive force was sensed and/or the quality of the non-conductive force (e.g., the temperature of the non-conductive force, whether the encounter was with a stationary object or from a "soft" non-capacitive touch, the amount of pressure sensed during the encounter with the non-conductive force, etc.). That is, the response selected when the non-conductive force is from a non-capacitive human touch on the animated figure's hand may be different from the response selected when the non-conductive force is from an inanimate object hitting the back of the animated figure's head. In a similar way, the force of the selected response may be based on the zone in which the non-conductive force was sensed, the quality of the non-conductive force, or the selected response itself.

The selected response may be a movement of the animated figure, accomplished by actuators within the animated figure. The response from the animated figure may cause the animated figure to move at an unexpected speed, force, direction, or any combination thereof. Moreover, the speed of the movement of the animated figure may be relatively faster than sensors associated with the animated figure used to detect nearby objects and prevent such collisions with physical objects. Thus, the compliance system may be used to verify that animated figures comply with movement expectations (e.g., move in an expected manner) when responding to encounters with an object, including a guest or a physical obstacle. If the compliance system determines that the animated figure is not in compliance with movement expectations (e.g., does not move in an expected manner), for example based on detection of an obstacle or other unexpected event, the compliance system will perform a correction, including stopping, redirecting, or changing the movement until the animated figure is within compliance.

In some instances, the shells of the animated figure on which the pressure sensing technology is disposed may be modular and removable. In this way, the shells used on one animated figure may be removed from one animated figure and attached to another animated figure that may operate in similar contexts such that it would be appropriate for both figures to sense and respond to pressure and/or capacitive touch in a similar manner. In such situations, a single set of shells may be used on multiple animated figures without having to re-calibrate how the shells sense and respond to pressure or touch. Further, making the shells modular and removable may reduce the financial and temporal cost as the shells may be repurposed from an existing character to a new character.

It should be noted that although examples provided herein may be specifically directed to particular features of an animated figure of an amusement park, the techniques in this disclosure may be applied to other conditions and/or contexts. Thus, the present examples should be understood to reflect real-world examples of the amusement park to provide useful context for the discussion, and should not be viewed as limiting further applicability of the present approach. For example, the present disclosure should be understood as being applicable to additional or alternative situations in which monitoring actuation, such as speed, force, pressure, and other measurable aspects of actuation, may be utilized, such as for components of electric vehicles, industrial plants, machinery, air conditioning systems, and so forth. Moreover, although the present disclosure generally discusses the systems and methods with respect to an animated figure, the systems and methods may apply to any animated figures, such as marionettes and the like, such as features in an amusement park ride that may move as a ride vehicle progresses along ride tracks of the amusement park ride.

With the foregoing in mind, FIG. 1 is a schematic diagram of an animated FIG. 12 interacting with a guest 14, in which the animated FIG. 12 may be integrated with or communicate with an interaction system discussed herein. As part of the interactions, the animated FIG. 12 may move one or more of its extremities 16. In the depicted embodiment, the extremities 16 may include a first extremity 16A, a second extremity 16B, and a third extremity 16C. The first extremity 16A may include a head, which may move up and down, side to side, and so forth as components of the first extremity 16A actuate to interact with the guest 14. The second extremity 16B may be an upper extremity including an upper arm, a forearm, and/or a hand. The second extremity 16B may extend from a shoulder to fingers of the animated FIG. 12. The second extremity 16B may also include components that actuate to provide movements at the second extremity 16B, where the movements may include bending the arm, raising the arm, moving the hand, and so forth, to interact with the guest 14. Similarly, the third extremity 16C may be a lower extremity that includes a hip, a leg, a knee, an ankle, and/or a foot. Moreover, the third extremity 16C may also include components that actuate to provide movements at the third extremity 16C to interact with the guest 14, such as movements including bending at the knee, raising the leg, moving the hip and/or ankle, and so forth. In some embodiments, the movements may involve walking, running, sitting down, standing up, and so forth. As previously mentioned, such movements may occur at a particular speed, with a particular force, and so forth. The movements may occur at an unexpected speed and/or force, and as such, may not comply with an animation profile or movement threshold of the animated FIG. 12, which may include a predetermined speed and/or force threshold associated with the animated FIG. 12, in order for the animated FIG. 12 to operate as expected.

Figure 3:
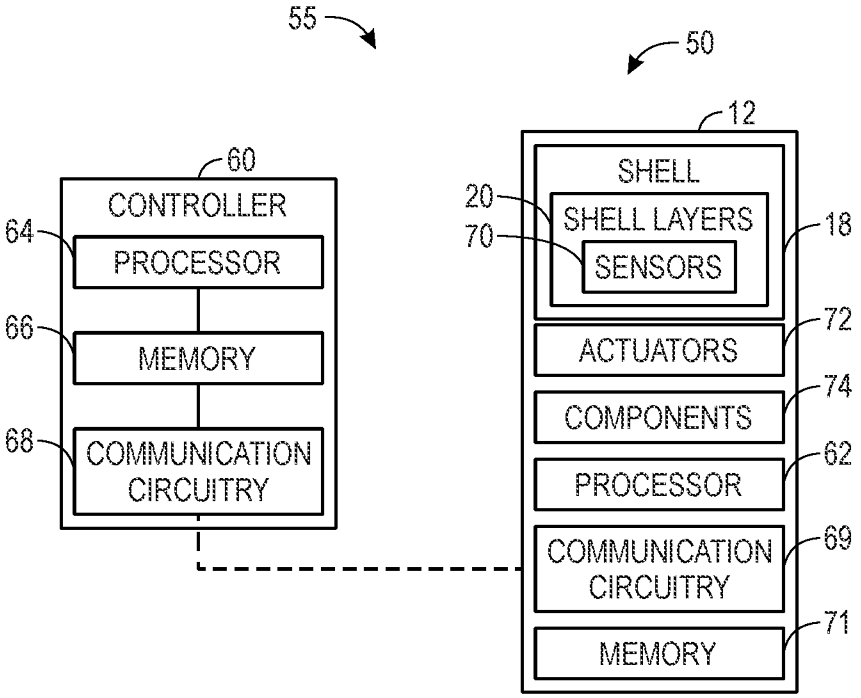
FIG. 3 is a block diagram of a compliance control system for monitoring and operating the animated figure of FIG. 1, in accordance with an embodiment of the present disclosure.

To monitor and/or verify compliance of the expected motion of the animated FIG. 12, the animated FIG. 12 may include an interaction system 50 (as shown in FIG. 3). The interaction system 50 may include one or more shells 18 disposed on the animated FIG. 12. Specifically, the shells 18 may be disposed on the animated FIG. 12 in a manner that allows monitoring and/or controlling components of the animated FIG. 12 that facilitate movement of the animated FIG. 12, such as components disposed at or near the extremities 16. Generally, the shells 18 may be capable of detecting pressure at a specific location on the shell 18. The level of granularity of the location of the detected pressure is based on the technology in the shells 18. A single shell on the forearm, for example, could detect pressure anywhere on the shell 18 and may be able to pinpoint the location of the pressure on the forearm shell. The shells 18 may also be disposed in a manner that may allow sensing pressure anywhere on the animated FIG. 12, for example, for the animated FIG. 12 to move in response to the sensed pressure, and thus the shells 18 may facilitate ensuring that the animated FIG. 12 is moving in an expected manner and/or within a predetermined control routine and movement threshold, e.g., in accordance with the protocol corresponding to the animation profile of the animated FIG. 12. Moreover, thresholds for compliance with movement in an expected manner may be the same for certain movements, or may differ based on the movement and the specific extremities covered by a shell 18, a zone (e.g., entire leg) corresponding to one or more shells 18, and so forth.

As such, the shells 18 may be generally disposed on the animated FIG. 12 in a manner than facilitates monitoring pressure on the animated FIG. 12 (e.g., pressure due to encounters with a guest or physical obstacle) and monitoring the response of the animated FIG. 12 to the pressure (e.g., movement of the animated FIG. 12 as a response to the pressure) to confirm compliance with expected movement of the animated FIG. 12. In some embodiments, and as shown in FIG. 1, the animated FIG. 12 includes a first shell 18A, a second shell 18B, a third shell 18C, a fourth shell 18D, a fifth shell 18E, and a sixth shell 18F. Here, the first shell 18A may encase the head of the frame of the animated FIG. 12, the second shell 18B may encase a chest of the frame of the animated FIG. 12, the third shell 18C may encase an upper arm of the frame of the animated FIG. 12, and the fourth shell 18D may encase a forearm of the frame of the animated FIG. 12. Similarly, the fifth shell 18E may encase a stomach of the frame of the animated FIG. 12 and the sixth shell 18F may encase a leg of the frame of the animated FIG. 12. Determining compliance with expected movement of the animated FIG. 12 is described in more detail below.

Additionally, the shells 18 may also provide structural support over internal components used as a skeleton of the animated FIG. 12. Specifically, the animated FIG. 12 may be built around an internal support frame or a "skeleton," that may be made of steel, metal, plastic and/or other suitable and/or similar materials. Elastic netting may be attached for midlevel support around the internal support frame or "bones" and/or "muscle." This frame (e.g., the internal support frame and/or the midlevel support) may provide support for electronic and mechanical components, which for example, facilitate movement and interactions between the animated FIG. 12 and the guest 14.

The animated FIG. 12 may also include motors and actuators to assist in the movement of the animated FIG. 12 and interactions between the animated FIG. 12 and the guest 14 or with a physical obstacle. In some embodiments, materials may be attached or placed over the frame to form "skin" that is often made from foam, rubber, silicone, urethane, other flexible or semi-flexible materials, or the like. The frame and/or the skin of the animated FIG. 12 may be encased in shells 18. The shells 18 may be made of materials similar to the skin, as well as hard plastic materials and/or soft plastics or like materials. As will be discussed in detail with respect to FIG. 2A, the materials may be conductive or nonconductive to facilitate determining that pressure (e.g., a force) is applied to the animated FIG. 12 (e.g., touch).

Figure 2A:
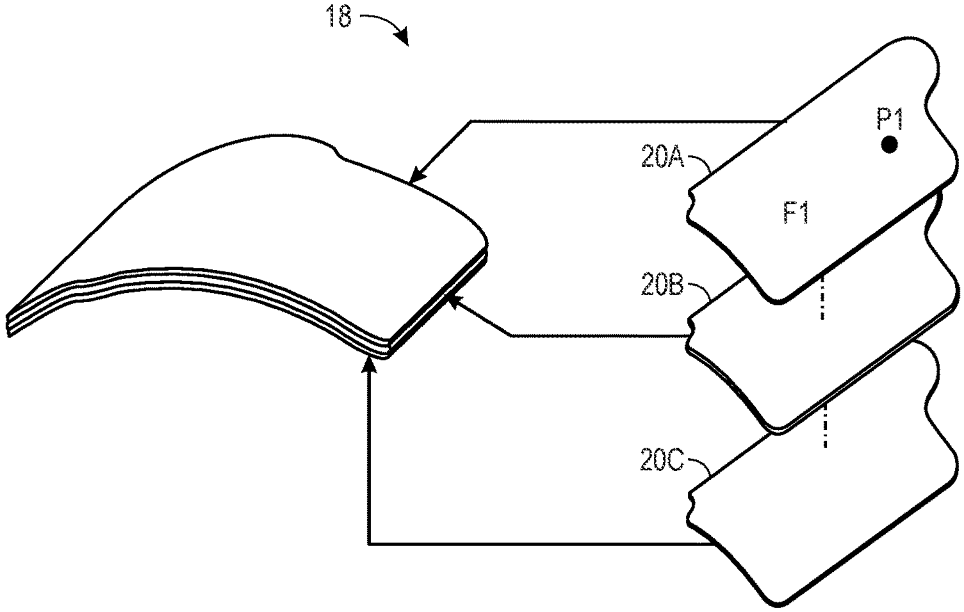
FIG. 2A is a schematic diagram of one or more shells on the animated figure of FIG. 1, in accordance with an embodiment of the present disclosure.

To illustrate, FIG. 2A depicts one or more shells 18 on the animated FIG. 12 of FIG. 1. Although the following discussion describes a single shell 18 on the animated FIG. 12, the system and methods described herein may apply to one or more shells 18, as well as to non-shell portions of the animated FIG. 12. For example, the skin (under the shells 18) of the animated FIG. 12 may additionally or alternatively include a similar or corresponding sensing technique (e.g., layers of conductive and/or nonconductive materials).

The structure of the shells 18 may include two or more shell layers 20. In one embodiment, as shown in FIG. 2A, the shell layers 20 include a first layer 20A, a second layer 20B, and a third layer 20C. Generally, the first layer 20A and the third layer 20C may include conductive materials while the second layer 20B may include nonconductive and/or dielectrical material. In some embodiments, the shell layers 20 may be 3D printed to embed the conductive or dielectric materials into the shell 18. In another embodiment, the conductive or dielectric materials on the shell layers 20 may be adhered to the shell 18. In some embodiments, the shell layers 20 may also include shell sensors 70. In the illustrated embodiment of FIG. 2A, shell sensors 70 may be located on the second layer 20B, although it should be understood that shell sensors 70 may be located on the first layer 20A and/or the third layer 20C or otherwise on the shell 18. Additionally, the shell layers 20 may also include optical sensors to detect the form of a guest or an object.

The shell sensors 70, alone or in combination with optical sensors, on the shell layers 20 allow the shell 18 to detect and/or measure pressure, displacement, fluid levels, acceleration, force, the location of a force on the shell 18, proximity of the shell 18 with respect to a source of force, and the like. For purposes of this disclosure, the term "pressure sensing technology" includes technology that senses pressure, acceleration, displacement, force, the location of a force on the shell 18, proximity of the shell 18 with respect to a source of force, and the like. Pressure sensing technology includes but is not limited to capacitive sensing technology. That is, the shell layers 20 may utilize capacitive sensing technology. While resistive touch technology is used to detect a force via a resistive touch sensor exerted by an object that is not a capacitor (e.g., a wall or a strong wind), capacitive sensing technology is used when the object creating the force acts as a capacitor, for example, a human touch. More specifically, capacitive sensing technology is a technology based on capacitive coupling that can detect and measure anything that is conductive or has a dielectric different from air. Specifically, capacitive sensing based on capacitive coupling may be facilitated using sensors and alternating or repeating layers of both conductive and non-conductive material. Specifically, when a force is applied to the capacitive sensing technology of the shell layers 20 (e.g., human touch), the shell sensors 70 may detect and measure any force or movement that is conductive or has a capacitance different from a baseline as the force is applied, as described in more detail below. For example, a standard stylus cannot be used for capacitive sensing, but special capacitive stylus, which are conductive, exist for the purpose. One can even make a capacitive stylus by wrapping conductive material, such as anti-static conductive film, around a standard stylus or rolling the film into a tube. Some capacitive sensing materials cannot be used with gloves, and can fail to sense correctly with even a small amount of water between the source of touch and the capacitive sensing material.

Generally, capacitive sensing technology may include at least one capacitive touch sensor along with at least two complementary metal-oxide-semiconductor integrated circuit chips, an application-specific integrated circuit controller, a digital signal processor, or any combination thereof. The capacitive touch sensor may be constructed from many different media, such as copper, indium tin oxide, printed ink, or other suitable media.

There are two types of capacitive sensing technology: surface capacitive systems and projected capacitive systems. In both a surface capacitive system and a projected capacitive system, the system utilizes two or more layers. For example, in one embodiment as shown in FIG. 2A, the shell 18 has three layers, a first conductive layer 20A, a second layer 20B that is nonconductive or dielectric, and a second conductive layer 20C. In a surface capacitive system, a small voltage may be applied to the conductive layers 20A and 20C, resulting in a uniform electrostatic field F1 having a voltage V. When a conductor (e.g., human touch, a wall, another component of the animated FIG. 12) contacts layer 20A at a touch point P1, a capacitor is dynamically formed and a small current flows from the touch point P1 causing the voltage V to drop. The voltage drop is sensed by the four corners of layer 20A, allowing the sensor 70 to indirectly pinpoint the exact location of the touch point P1 from the change in capacitance.

Figure 2B:
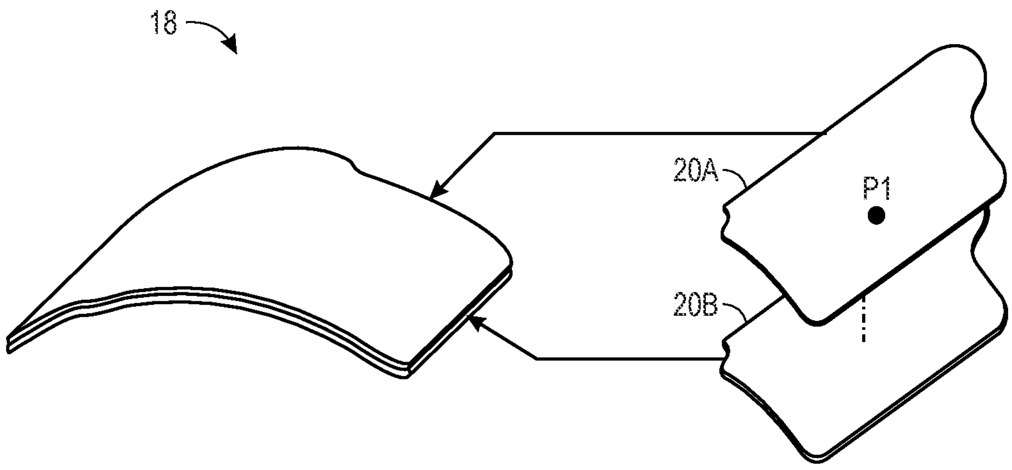
FIG. 2B is a schematic diagram of one or more shells on the animated figure of FIG. 1, in accordance with an embodiment of the present disclosure.

In another embodiment, the shell sensors 70 may utilize a projected capacitance system as shown in FIG. 2B. Similar to the surface capacitance system, a projected capacitance system utilizes layers of materials, 20A and 20B as shown in FIG. 2B. However, in a projected capacitance system, one of the material layers, for example 20B, may include electrodes in an X-Y grid. Specifically, an X-Y grid is etched into the layer 20B either by etching one layer to form a grid pattern of electrodes or by etching two separate, parallel layers of conductive material with perpendicular lines or tracks to form the grid. Like the surface capacitance system, the projected capacitance system includes a uniform electrostatic field that, when touched, results in a lower voltage. Specifically, when a conductor (e.g., human touch) or conductive material contacts the outside surface 20A, there is a change in the local electrical field which changes the capacitance at a particular location on the grid. In a projected capacitance system, the shell sensors 70 may utilize one of two types of projected capacitance systems: mutual capacitance technology or absolute capacitance technology. In either system, the location of the force may be determined based on the location of the change in capacitance.

While both surface capacitance and projected capacitance systems are capable of detecting granular information, such as touch at respective locations, projected capacitance systems are more responsive to touch commands than surface capacitive systems and may also support multi-touch commands.

As discussed above, capacitive sensing technology is one type of pressure sensing technology. Capacitive sensing technology is used when the object creating the pressure acts as a capacitor, for example, a human touch. Other types of pressure sensing technology, such as resistive touch technology, may be used to detect pressure exerted by an object that is not a capacitor, for example a wall or a strong wind. Resistive touchscreens, which react to any object exerting pressure therefore do not require a capacitive pointer (e.g., human touch). Other types of pressure sensing technology include force sensing membranes, which may include an elastomer with conductive particles positioned between two conducting contacts. The overall structure of the shell 18 remains the same, regardless of the particular type of pressure sensing technology used. One or more of the types of pressure sensing technology described herein may be used in combination and simultaneously to allow for overlapping responses to various kinds of touch or force.

In particular, the shell layers 20 may be associated with a baseline capacitance when no force is applied to the shell 18. A baseline capacitance may be associated with the shells 18, the shell layers 20 that constitute each shell 18, a group of multiple shells 18, a zone including multiple shells 18 corresponding to an area of the animated FIG. 12, and/or a body portion of the animated FIG. 12, and so forth. That is, the shell layers 20 may be associated with a baseline capacitance including a capacitance when no force, or approximately no force, is applied to the various shells 18 of the animated FIG. 12.

The shell layers 20 that contain the pressure sensing technology may be embedded or otherwise integrated with the structural composition of the animated FIG. 12, such as with the shells 18 and/or the skin. In additional or alternative embodiments, pressure sensing technology may be embedded or adhered to the shell 18. By way of example, pressure sensing technology may be placed within an adhering material (such as neoprene, other synthetic rubbers, and the like). The adhering material, including the conductive portion, may be attached to the shell 18 to provide the capacitance sensing effect previously discussed. As such, the animated FIG. 12 may include 3D printed materials along with neoprene having a conductive portion. As previously mentioned, the embedded and/or adhesive pressure sensing via the materials embedded or adhered to the shells 18 may facilitate monitoring compliance of the animated FIG. 12 with expected movement, as well as controlling the animated FIG. 12 to ensure compliance with expected movement.

The shell layers 20 may also be associated with a threshold for capacitance that allows deviating from the baseline capacitance. In some instances, the thresholds may vary, for example, based on the zone, expected pressures may differ (e.g., due to environmental factors or common interactions between the animated FIG. 12 and the guest 14). As such, the shell layers 20 may facilitate determining whether the animated FIG. 12 is in compliance (i.e., operating as expected) by using the pressure sensing technology to sense at least applied pressure, acceleration, displacement, force, the location of a force on the shell 18, or proximity of the shell 18 with respect to a source of force associated with the movement of the animated FIG. 12. In this manner, the animated FIG. 12 may be controlled to pause, stop, reverse, accelerate (e.g., change speed and/or direction), and the like when the capacitance is over the threshold, indicating that the animated FIG. 12 is not operating as expected.

To illustrate, FIG. 3 is a block diagram of an interaction system 50 for monitoring and operating the animated FIG. 12 to interact with an object and respond in compliance with expected movement. As shown in FIG. 3, the interaction system 50 includes an automation controller 60 (e.g., a programmable controller, an electronic controller, control circuitry, a cloud computing system) and the animated FIG. 12. As previously discussed, the animated FIG. 12 may include one or more shells 18, which include shell layers 20 containing shell sensors 70, which are used for sensing pressure, touch, force, and the like, and, in some embodiments, optical sensors, which are used for detecting form and/or movement. The animated FIG. 12 may also include figure communication circuitry 69, figure processor 62, actuators 72, and components 74. The automation controller 60 may include automation controller communication circuitry 68, and automation controller memory 66. The automation controller 60 may monitor the animated FIG. 12 based on input data from the shell sensors 70. The automation controller 60 may also control the animated FIG. 12 to ensure compliance of the movement of the animated FIG. 12, for example, based on specific thresholds associated with the shells 18. Based on the input data received at the shells 18, the automation controller 60 may instruct to adjust the actuators 72 and/or other components 74 to issue compliance instructions to cause the animated FIG. 12 to be in compliance and operate as expected, for example, in accordance with a protocol corresponding to an animation profile.

In particular, the automation controller 60 may include an automation controller processor 64, an automation controller memory 66, and an automation controller communication circuitry 68. In some embodiments, the shell layers 20 may also include optical sensors for the additional ability to detect form and/or movement. The animated FIG. 12 may also include the figure communication circuitry 69, which may be embedded in or adhered to the shell layers 20. The animated FIG. 12 may also include a figure memory 71 with which instructions may be stored. Alternatively, in other embodiments, the animated FIG. 12 may not include a figure memory 71.

With reference to FIG. 3, generally, the actuators 72 may include generators of forces to move the animated FIG. 12 itself. Specifically, the actuators 72 may include devices that convert energy (e.g., electrical, air, or hydraulic, and the like) into mechanical or physical motion, and many actuators produce rotary or linear motion. Linear actuators may be defined by force while rotary actuators may be defined by torque. That is, the actuators 72 enable movement for the animated FIG. 12. Additionally, the actuators 72 may work in conjunction with the components 74, which may include devices or materials of the animated FIG. 12. That is, the actuators 72 may work with the components 74 to cause the animated FIG. 12 to move.

The shell layers 20 may provide input data from the shells 18 (e.g., that includes embedded or adhesive sensors) to the automation controller 60, such as via the automation controller communication circuitry 68 that enables communication between the automation controller 60 and the animated FIG. 12. The input data may contain data that indicate pressure, acceleration, displacement, force, the location of a force on the shell 18, proximity of the shell 18 with respect to a source of force. In an embodiment, based on the input data, the automation controller 60 may determine whether or not the movement of the animated FIG. 12 is within the threshold corresponding to the shells 18. In an embodiment, the movement of the animated FIG. 12 may be in response to the encounter with an object. The automation controller 60 may determine that the animated FIG. 12 may not presently be in compliance, for example, the animated FIG. 12 movement is outside the movement threshold based on the animation profile. As such, the automation controller 60 may determine a correction of the animated FIG. 12 based on the non-compliance by selecting a correction from a list of available corrections. Such correction may include dynamically adjusting the actuators 72 and/or the components 74 based on the input data to move the animated FIG. 12, shutting down the power source for the animated FIG. 12, or the like. The determination of the correction by the automation controller 60 may depend on the amount of force that was sensed or other environmental factors. The automation controller 60 may provide the selected correction to the animated FIG. 12 via compliance instructions delivered by the automation controller communication circuitry 68.

Specifically, the shell layers 20 that contain the pressure sensing technology may provide input data via the shell sensors 70 to the figure communication circuitry 69. The figure communication circuitry 69 communicates the input data to the automation controller communication circuitry 68 via wired communication paths or wireless communication paths (e.g., Infrared wireless communication, radio frequency transmission, Bluetooth, Wi-Fi, near-field communication (NFC), ultra wideband (UWB)). The automation controller communications circuitry 68 receives the input data from the figure communications circuitry 69 and provides the input data to the automation controller processor 64. The automation controller processor 64 then processes the input data received from the figure communication circuitry 69 and determines if the input data exceeds a movement threshold or a force threshold or both based on threshold data stored in the automation controller memory 66. If the automation controller processor 64 determines that a movement threshold, a force threshold, or both are exceeded, the automation controller processor 64 may then select a correction from a variety of correction, communicate the selected correction to the figure communication circuitry 69 using the automation controller communication circuitry 68. The figure communication circuitry 69 sends the correction to the figure processor 62, which instructs the animated FIG. 12 to execute the correction. The correction may help bring the movement of the animated FIG. 12 back within compliance (e.g., take a step backwards, take a step forwards, lower the animated figure's arm, power off completely, etc.).

For example, when interacting with an animated FIG. 12, a guest 14 touches the fourth shell 18D that encases a forearm of the frame of the animated FIG. 12 with the guest's hand. The shell layers 20 in the fourth shell 18D sense the pressure, using pressure sensing technology, and provide first input data to the automation controller 60, such as via the figure communication circuitry 69 communicating with automation controller communication circuitry 68. The figure communication circuitry 69 and the automation controller communication circuitry 68 enables communication between the automation controller 60 and the animated FIG.

12. Based on the first input data, as well as a first criteria, e.g., the baseline capacitance previously discussed, the automation controller 60 may determine a pressure has been sensed and determine a response to the sensed pressure. The automation controller 60 may then provide instructions to the animated FIG. 12 regarding the response, for example instructions to dynamically adjust the actuators 72 and/or the components 74 to respond to the guest's touch with a wave of the animated figure's 12 hand. The movement associated with the response may be detected by the pressure sensing technology within the shells 18 and the automation controller 60 may determine whether or not the response of the animated FIG. 12 is within the threshold corresponding to the shells 18. In this example, the automation controller 60 receives second input data from the shells 18 and based on this second input data determines that the animated FIG. 12 may not presently be in compliance because the pressure sensed as a result of the response wave exceeds the movement threshold associated with the animation profile of the animated FIG. 12. As such, the automation controller 60 may determine a correction of the animated FIG. 12 based on the non-compliance by selecting a correction from a list of corrections. Such correction may include dynamically adjusting the actuators 72 and/or the components 74 based on the input data, for example, such that the movement of the animated FIG. 12 is corrected by waving more slowly. The determination of the correction by the automation controller 60 may depend on the amount of force that was sensed or other factors such as where on the animated FIG. 12 the guest touch occurred, the immediate environment of the animated FIG. 12 (e.g., outside, in an enclosed space, inside a dark ride), whether the force was capacitive or resistive, and the like. The automation controller 60 may provide compliance instructions containing the selected correction—here, the slowing down of the wave—to the animated FIG. 12 via the automation controller communication circuitry 68.

In another example, when interacting with an animated FIG. 12, a guest 14 raises her hand to high-five the animated FIG. 12. In an embodiment where the shell layers 20 include optical sensors, the shell layers 20 may sense the form of the guest raising her hand, and, in response to the detected form, provide first input data to the automation controller 60, such as via the automation controller communication circuitry 68 that enables communication between the automation controller 60 and the animated FIG. 12. Based on the first input data, the automation controller 60 may determine a gesture to initiate a high-five has been detected and determine a response to the detected gesture. The automation controller 60 may then provide instructions to the animated FIG. 12 regarding the response, for example instructions to dynamically adjust the actuators 72 and/or the components 74 to respond to the guest's gesture with a return high-five of the animated figure's 12 hand. The movement associated with the response may be detected by the pressure sensing technology within the shells 18 and the automation controller 60 may determine whether or not the response of the animated FIG. 12 is within the threshold corresponding to the shells 18. In this example, the automation controller 60 receives second input data from the shells 18 and based on this second input data determines that the animated FIG. 12 may not presently be in compliance because the pressure sensed as a result of the response high-five indicates, for example, that the animated FIG. 12 did not make contact, touched something before it expected to, or that the animated FIG. 12 made contact at the expected time but with an unexpected source or an unexpected pressure (e.g., sensed contact with an inanimate object instead of the guest's hand, sensed contact with a capacitive source at an unexpected point of contact, or sensed contact indicative of a high-five but with a detected force that is too high or too low). In that case, the second input data indicates that the response touch, or lack thereof, did not match the expected movement threshold associated with the animation profile of the animated FIG. 12. As such, the automation controller 60 may determine a correction of the animated FIG. 12 based on the non-compliance by selecting a correction from a list of corrections. Such correction may include those previously mentioned and/or backing away from the guest, lowering the animated figure's 12 arm, or stopping movement altogether. The determination of the correction by the automation controller 60 may depend on the amount of force that was sensed or other environmental factors. As mentioned previously, the automation controller 60 may provide compliance instructions containing the selected correction. In this way, the movements of the animated FIG. 12 in response to an encounter are monitored in order to ensure that the response of the animated FIG. 12 is in compliance with an expected movement of the animated FIG. 12, that is the animated figure remains within predetermined movement thresholds, for example an animation profile.

In an embodiment, movements of the animated FIG. 12 that are not in response to an encounter with a guest or physical obstacle may be monitored to ensure the movement of the animated FIG. 12 is in compliance with an expected movement of the animated FIG. 12. The automation controller 60 may be configured to monitor and control the animated FIG. 12 based on movement thresholds associated with the one or more shells 18 on the animated FIG. 12.

The automation controller communication circuitry 68 and the figure communication circuitry 69 may include transceivers, antennas, transmitters, receivers, radio transceiver circuits, and signal processing hardware and/or software (e.g., hardware or software filters, analog/digital converters, multiplexers amplifiers), or a combination thereof, that may be powered by a power source and configured to communicate over wired (e.g., via fiber optics, metal wires) or wireless communication paths (e.g., via Infrared wireless communication, radio frequency transmission, Bluetooth, Wi-Fi, near-field communication (NFC), ultra wideband (UWB), etc.), or a combination of wired and wireless.

In some embodiments, the automation controller communication circuitry 68 and the figure communication circuitry 69 may form a communication connection with the shell sensors 70 using a wireless network, for example, wireless communication paths via IR wireless communication, radio frequency transmission, Bluetooth, Wi-Fi, ultra wideband (UWB), etc. That is, the shells 18 may be equipped with devices including the shell sensors 70 that enable the communication between the automation controller 60 and the animated FIG. 12. For example, the automation controller 60 and the animated FIG. 12 may include automation controller communication circuitry 68, and figure communication circuitry 69, such as a transmitter and a receiver.

As provided herein, the automation controller communication circuitry 68 may communicate with the animated FIG. 12 by sending a signal that is received by the figure communication circuitry 69. The shell sensors 70 embedded or adhered to the shells 18 may sense force and communicate that to the figure communication circuitry 69. The figure communication circuitry 69 may then communicate proximity information back to the automation controller 60 via the automation controller communication circuitry 68. The proximity information may include information regarding the distance from and orientation of the force in relation to the location of the shells 18. The automation controller processor 64 then receives the proximity information and may trigger a response based on the received proximity information, the response including updating the position of the animated FIG. 12 or activating a correction to the animated FIG. 12. Updating the position of the animated FIG. 12 or activating a correction of the animated FIG. 12 may be accomplished through sending instructions via the automation controller communication circuitry 68 and the figure communication circuitry 69, which are then processed by the figure processor 62 and carried out by actuators 72, as discussed above.

Generally, the automation controller 60 may enable the automation controller communication circuitry 68 to interface with various other electronic devices, such as an external monitoring system, a service desk, and so forth, of the amusement park. The monitoring system and/or the service desk may communicate with the automation controller 60 to receive and/or send information to ensure that the interactive system 50, the animated FIG. 12, and/or features of the animated FIG. 12 are in compliance.

By way of example, the automation controller communication circuitry 68 may allow the automation controller 60 to communicatively couple to a network, such as a personal area network (PAN), a local area network (LAN), and/or a wide area network (WAN). Accordingly, in some embodiments, the automation controller 60 may process data from the shells 18, determine compliance for the animated FIG. 12, as well as communicate the adjustments to the actuators 72 and/or the components 74. For example, after processing sensor data from the shells 18, the automation controller processor 64 may determine a control signal that enables the automation controller communication circuitry 68 to wirelessly transmit control data to the animated FIG. 12 to correct the animated FIG. 12 and/or confirm that the animated FIG. 12 is functioning as operated within a threshold.

The automation controller processor 64 may include one or more processing devices that receive input signals from the shells 18 via the shell sensors 70 and/or the figure communication circuitry 69 relating to the compliance of the animated FIG. 12, which may then be used to determine possible adjustments to the actuators 72 and/or the components 74, using techniques described herein. The automation controller memory 66 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the automation controller processor 64 or by other processor-based devices. In particular, the automation controller processor 64 may include a processing core to execute machine-executable instruction algorithms stored in the automation controller memory 66. The automation controller processor 64 may also include processor-side interfaces for software applications running on the processing core to interact with the animated FIG. 12. By way of example, the stored algorithms may include, but are not limited to, algorithms to process feedback from the shell sensors 70. The algorithms may also cause the automation controller processor 64 to process the feedback, compare it to the baseline capacitance, and issue compliance instructions from the automation controller memory 66 to the animated FIG. 12 to cause the animated FIG. 12 to operate accordingly.

The compliance instructions are stored in the automation controller memory 66 and include instructions for the animated FIG. 12 to correct the animated FIG. 12 if it is determined to be out of compliance. The compliance instructions may include corrections for the animated FIG. 12, including instructions for the animated FIG. 12 to move away from the sensed pressure, for example by moving in the opposite direction of the sensed force/pressure, or could be associated with a response to sensing capacitive touch from a guest 14, such as a high five in response to sensing capacitive touch sensed on the arm of the animated FIG. 12 or a hug in response to sensing capacitive touch on the torso of the animated FIG. 12, as discussed previously.

Figure 4:
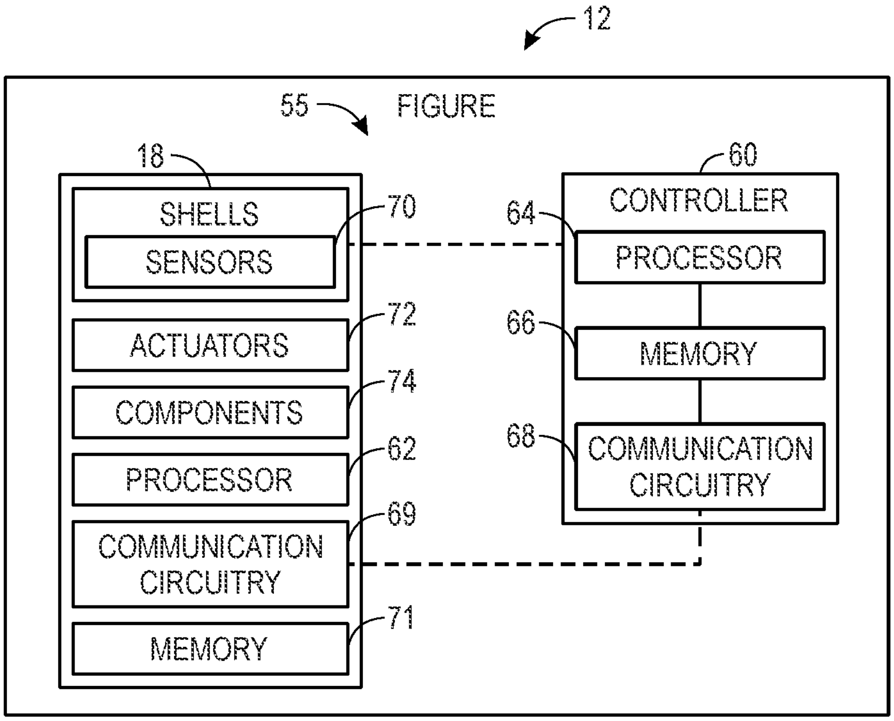
FIG. 4 is a block diagram of a compliance control system for monitoring and operating the animated figure of FIG. 1, in accordance with an embodiment of the present disclosure.

In FIG. 4, another embodiment of the interactive system 50 is illustrated. In the embodiment as illustrated in FIG. 4, the automation controller 60 is integrated with the shells 18 or the animated FIG. 12. In one embodiment, the animated FIG. 12 may receive input data from the figure communication circuitry 69, such as from the shell sensors 70 in the shell layers 20. In such an embodiment, the input data goes from the shell sensors 70 to the figure processor 62. The data then goes to the figure communication circuitry 69 and is transmitted to the automation controller communication circuitry 68 as described above with respect to FIG. 3. In an embodiment, the automation controller 60 may comprise the figure processor 62. In an embodiment, the figure processor 62 may comprise the automation controller 60. Moreover, it should be understood that the illustrated system is merely intended to be exemplary, and that certain features and components may be omitted and various other features and components may be added to facilitate performance, in accordance with the disclosed embodiments.

Figure 5:
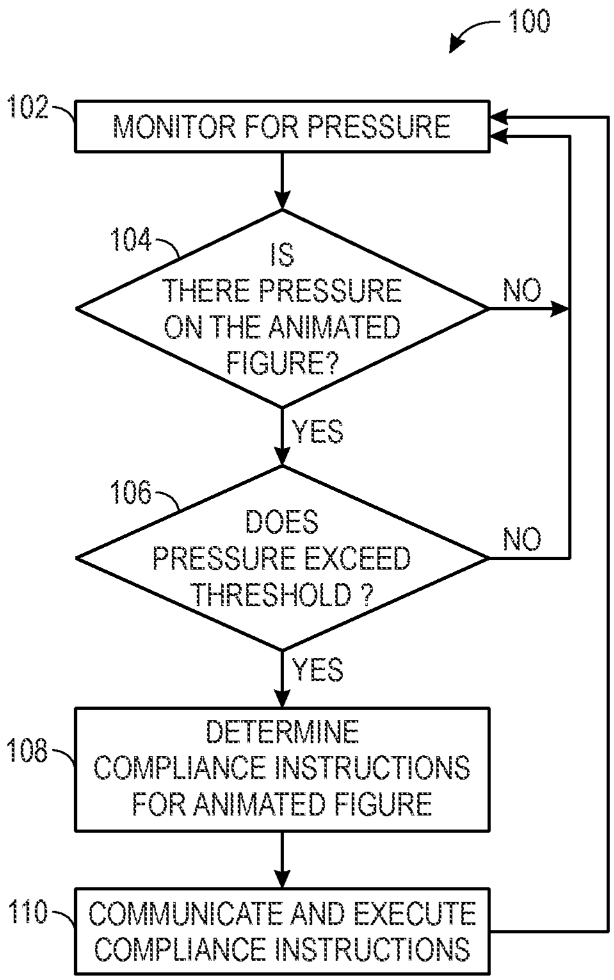
FIG. 5 is a process flow diagram of a method for monitoring compliance for the animated figure of FIG. 1, in accordance with an embodiment of the present disclosure.

FIG. 5 is a flow diagram of a process 100 of the compliance system 55, which is one component of the interaction system 50. Although the process 100 describes the flow of data and conditions in a particular order, which represents a particular embodiment, the data and conditions may occur in any order.

The process 100 includes a step of monitoring a system including an animated figure for pressure (block 102). If pressure (e.g., force) is sensed (block 104) via the pressure sensing technology in the shells 18 of the animated FIG. 12, which may be capacitive sensing technology or other pressure sensing technology. If pressure is sensed, the figure processor 62 determines whether the pressure exceeds a threshold (block 106). Determining whether the pressure exceeds the threshold depends on input data from the shells 18 and shell sensors 70 which is communicated via the figure communication circuitry 69 to the automation controller 60 and may include proximity information indicative of the location of the pressure (e.g., a zone), as described above. The automation controller 60 receives the input data from the animated FIG. 12 via the figure communication circuitry 69 which communicates with the automation controller communication circuitry 68. The input data is processed via the automation controller processor 64. The automation controller processor may determine whether the force or movement exceeds a threshold based on threshold data stored in the automation controller memory 66. The pressure may result, for example, from a response executed by the animated figure in response to an encounter with a guest or a physical obstacle.

If the figure processor 62 determines that the threshold is exceeded, compliance instructions (e.g., actuation instructions regarding movement of the animated figure (e.g., pause, stop, retrieve, high five, etc.)) are determined to correct the animated figure based on the type, location, and amount of the pressure (block 108). The compliance instructions are then communicated to and executed on the animated figure (block 110). The automation controller 60 communicates the compliance instructions to the figure communication circuitry 69, which are processed by the figure processor 62 and carried out by the actuators 72 on the animated FIG. 12.

Regarding block 104, if pressure (e.g., force) is not sensed, the process returns to block 102 to continue to monitor for pressure. Regarding block 106, if the sensed pressure does not exceed the threshold, the process returns to block 102 to continue to monitor for pressure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interaction system, comprising:
- an animated figure, wherein the animated figure comprises:
  - one or more capacitive touch sensors configured to sense applied pressure and disposed on an exterior of one or more features of the animated figure, wherein the one or more capacitive touch sensors comprise a plurality of shell layers, the plurality of shell layers comprising:
    - a first shell layer at least partially composed of a first conductive material;
    - a second shell layer at least partially composed of a second conductive material; and
    - a third shell layer at least partially composed of a dielectric material, wherein the third shell layer is disposed between the first shell layer and the second shell layer; and
  - one or more actuators configured to move the one or more features of the animated figure; and
- a compliance system comprising an automation controller configured to:
  - receive first input data from the one or more capacitive touch sensors;
  - initiate a control routine to instruct maneuvering the one or more actuators in response to the first input data meeting a first criteria;
  - receive second input data at a first time from the one or more capacitive touch sensors after initiation of the control routine; and
  - adjust the control routine in response to the first time preceding a second time, wherein the automation controller is configured to expect receipt of the second input data at the second time;
- wherein the first shell layer, the second shell layer, the third shell layer, or a combination thereof comprises a plastic that is rigid at room temperature.

2. The interaction system of claim 1, wherein the plurality of shell layers is modular and configured to decouple from the one or more features of the animated figure.

3. The interaction system of claim 1, wherein the one or more capacitive touch sensors comprise mutual capacitance technology, absolute capacitance technology, or a combination thereof.

4. The interaction system of claim 1, wherein the plurality of shell layers is disposed on the animated figure such that the shell layers provide structural support over a skeleton of the animated figure.

5. The interaction system of claim 1, wherein a voltage is applied to the first shell layer and the second shell layer, and a difference between the first input data and the second input data comprises a change in voltage in response to a change in a load applied to the first shell or the second shell.

6. The interaction system of claim 1, wherein the automation controller is configured to determine a location of a touch point of a force exerted on the animated figure based on the first input data.

7. The interaction system of claim 1, wherein the automation controller is configured to adjust a frequency of a repetitive motion of the one or more actuators in response to the second input data falling outside of compliance with the control routine.

8. The interaction system of claim 1, wherein the automation controller is configured to adjust the control routine in response to the second input data being received from a capacitive touch sensor of the one or more capacitive touch sensors, and the automation controller is configured to not expect receipt of the second input data from the capacitive touch sensor.

9. A method for monitoring compliance of an animated figure, the method comprising:
- sensing, via an automation controller, a force on the animated figure based on input data received from one or more capacitive touch sensors at a first time, the one or more capacitive touch sensors comprising a plurality of shell layers, wherein the plurality of shell layers comprises:
  - a first shell layer at least partially composed of a first conductive material;
  - a second shell layer at least partially composed of a second conductive material; and
  - a third shell layer at least partially composed of a dielectric material, wherein the third shell layer is disposed between the first shell layer and the second shell layer;
- determining, via the automation controller, the animated figure exceeds a movement threshold associated with the animated figure based, at least in part, on the first time preceding a second time, wherein the automation controller is configured to expect receipt of the input data at the second time; and
- sending, via the automation controller, compliance instructions to one or more actuators to bring the animated figure into compliance with the movement threshold based on the animated figure exceeding the movement threshold;

wherein the first shell layer, the second shell layer, the third shell layer, or a combination thereof comprises a plastic that is rigid at room temperature.

10. The method of claim 9, comprising:

determining, via the automation controller, the animated figure does not exceed the movement threshold based on additional input data from the one or more capacitive touch sensors; and monitoring, via the automation controller, the one or more capacitive touch sensors to confirm that the additional input data from the one or more capacitive touch sensors indicates compliance with the movement threshold upon determining that the animated figure does not exceed the movement threshold.

11. The method of claim 10, comprising:

identifying, via the automation controller, a first force on the animated figure based on first input data received from a first capacitive touch sensor disposed on the animated figure;

determining, via the automation controller, a response to the first force, wherein the response is determined based on a location associated with the first force;

determining, via the automation controller, the response includes movement of the animated figure, wherein the movement exceeds the movement threshold associated with the animated figure based on additional input data received from the first capacitive touch sensor and/or at least one other capacitive touch sensor of the one or more capacitive touch sensors disposed on the animated figure.

12. The method of claim 11, wherein the response includes instructing, via the automation controller, the animated figure to stop, pause, accelerate, high five a guest, hug the guest, move in a direction different than that of the force, or any combination thereof.

13. The method of claim 9, wherein the one or more capacitive touch sensors are configured to provide structural support over a skeleton of the animated figure.

14. The method of claim 9, comprising determining a location of a touch point of the force exerted on the animated figure based on the input data.

15. A compliance system comprising:

one or more capacitive touch sensors comprising a plurality of shells disposed on an animated figure, the plurality of shells comprising:

a first shell at least partially composed of a first conductive material;

a second shell at least partially composed of a second conductive material; and a third shell at least partially composed of a dielectric material, wherein the third shell is disposed between the first shell and the second shell;

one or more actuators; and an automation controller configured to:

receive first input data from the one or more capacitive touch sensors;

initiate a control routine to instruct maneuvering the one or more actuators in response to the first input data meeting a first criteria;

receive second input data at a first time from the one or more capacitive touch sensors after initiation of the control routine; and adjust the control routine in response to the first time preceding a second time, wherein the automation controller is configured to expect receipt of the second input data at the second time;

wherein the first shell, the second shell, the third shell, or a combination thereof comprises a plastic that is rigid at room temperature.

16. The compliance system of claim 15, wherein the one or more capacitive touch sensors detect a force applied to the animated figure via pressure sensing technology embedded or adhered to the plurality of shells.

17. The compliance system of claim 16, wherein the one or more capacitive touch sensors are configured to sense capacitive touch via a projected capacitance system, a surface capacitance system, or a combination thereof.

18. The compliance system of claim 16, wherein the automation controller is configured to select a correction from a list of corrections stored on a memory of the automation controller and communicate the selected correction to the animated figure via communication circuitry.

19. The compliance system of claim 18, wherein the automation controller is configured to determine the correction based on a zone of the plurality of shells in which the force is sensed.

20. The compliance system of claim 15, wherein the input data comprises a change in voltage of the first shell, the second shell, or both, in response to a force exerted onto the one or more touch capacitive sensors.

* * * * *